(12) United States Patent
Sagy et al.

(10) Patent No.: US 7,433,325 B1
(45) Date of Patent: Oct. 7, 2008

(54) NAT AND PROXY DEVICE DETECTION

(75) Inventors: Ravid Sagy, Zichron Yaacov (IL); Oren Shemesh, Gilboa (IL)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 11/430,689

(22) Filed: May 9, 2006

(51) Int. Cl.
*H04L 12/28* (2006.01)

(52) U.S. Cl. .................... 370/254; 370/400; 370/471; 709/220

(58) Field of Classification Search .................. None
See application file for complete search history.

(56) References Cited

U.S. PATENT DOCUMENTS 6,629,137 B1 *  9/2003  Wynn .................... 709/223

7,243,141 B2 *  7/2007  Harris .................... 709/220

OTHER PUBLICATIONS

RFC 791, Internet Protocol, www.rfc-archive.org, Sep. 1981.
Steven M. Bellovin, "A Technique for Counting NATted Hosts", http://www.cs.columbia.edu/~smb/papers/fnat.pdf.

* cited by examiner

*Primary Examiner*—Wing F. Chan
*Assistant Examiner*—Brian Roberts
(74) *Attorney, Agent, or Firm*—Abelman, Frayne & Schwab (57) ABSTRACT

Multiple networked devices behind a NAT device are identified by sampling a proportion of data packets traversing the network and comparing the packet IP Identification fields. Depending on proximity of the values in different packets, each sampled packet is associated with one of currently known devices using the NAT, or identified with a newly recognized device.

18 Claims, 4 Drawing Sheets

NAT AND PROXY DEVICE DETECTION

BACKGROUND OF THE INVENTION

1. Field of the Invention

This invention relates to data networks. More particularly, this invention relates to the identification of different devices on a network, which share a common network address.

2. Description of the Related Art

TABLE 1

| Acronyms and Abbreviations | |
|---|---|
| NAT | Network Address Translation |
| IP | Internet Protocol |
| IPID | IP Identification |
| RDR | Report Data Record |

For a computer to communicate with other computers or servers within a packet-switched network, e.g., the Internet, the computer must have a unique IP address. IP protocol version 4 specifies 32 bits for the IP address, which theoretically gives about 4,294,967,296 unique IP addresses. However, in practice there are actually only between 3.2 and 3.3 billion addresses available, due to reservation of some of the IP addresses for multicasting, testing and other special uses. Due to growth of the Internet, the number of IP addresses is now insufficient.

One solution for increasing the utility of the limited number of IP addresses is referred to as network address translation (NAT). NAT allows an intermediary device, e.g., computer, router or switch, which is located between the Internet and a local network, to serve as an agent for a group of local computers or devices. A small range of IP addresses or a single IP address is assigned to represent the local group. Each device within the local group is also given a local IP address that is only used within that local group. The local group's local IP addresses may duplicate IP addresses that are used within another local network. However, due to their limited scope, local IP addresses of different local groups do not conflict. When a local computer attempts to communicate with a remote computer situated outside the local network, the intermediary device matches the local computer's local IP address to one of the intermediary device's assigned IP addresses. The intermediary device then replaces the local computer's local address with the matched assigned IP address. The matched assigned IP address is then used to communicate between the local computer and the remote computer. Typically, a NAT device intercepts packets and performs network address translation prior to forwarding them via facilities of an Internet service provider to the intended recipient.

A new protocol, Internet Protocol Version 6 (IPv6), promises an IP address space that exceeds the connectivity needs of the foreseeable future. However, IPv6 is still in its early phases of deployment. Currently, enabling a community of clients within an enterprise to be uniquely addressable is typically accomplished through NAT. In general, the more devices that share an IP address, the more bandwidth of an Internet service provider must be allocated to that address. In order to optimize use of its facilities, and to ensure compliance with contractual terms, e.g., the number of devices permitted to use an internet connection concurrently, it would be desirable for the Internet service provider to know how many devices are concurrently active behind a NAT unit.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Overview.

Information is transmitted over the Internet in the form of packets (datagrams) having headers and data payloads. In addition to IP addresses, an IP packet header contains other information, as specified in the document RFC 791, available on the Internet. In particular, an IP packet header contains an IP identification field (IPID field). As explained in RFC 791, the IPID field was intended to be used to distinguish fragments of one datagram from those of another. The originator of an Internet datagram sets the IPID field to a value that is unique for that source-destination pair and protocol during the time the datagram will be active in the Internet system.

It has been observed in practice, that the IPID field is generally implemented as a simple counter. As a consequence, consecutive packets emitted by a device carry sequential IPID values. This fact is exploited by aspects of the invention. Strings of consecutive IPID field values represent strings of consecutive packets from one device. Different devices may initiate transmissions with the same IPID field value. However, due to many factors, for example different mixtures of sent and received packets, and different rates of packet generation, the IPID field values of the devices quickly diverge. Thus, the IPID field values of packets originating from the different devices generally lie in different ranges. Tracing the IPID field values enables the different devices to be identified. It has been proposed to analyze IPID field values in a packet stream to determine the number of hosts behind a NAT in the document A Technique for Counting NATted Hosts, Steven M. Bellovin, available on the Internet at the URL "http://www.cs.columbia.edu/~smb/papers/fnat.pdf." However, the author stated that the proposed method is primarily suitable for analyzing NAT's serving networks with comparatively little Intranet traffic, e.g., home NAT's and hotel NAT's, but not the majority of businesses, which tend to run their own file and email servers.

It has been observed in practice, that the IPID field is generally implemented as a simple counter. As a consequence, consecutive packets emitted by a device carry sequential IPID values. This fact is exploited by aspects of the invention. Strings of consecutive IPID field values represent strings of consecutive packets from one device. Different devices may initiate transmissions with the same IPID field value. However, due to many factors, for example different mixtures of sent and received packets, and different rates of packet generation, the IPID field values of the devices quickly diverge. Thus, the IPID field values of packets originating from the different devices generally lie in different ranges. Tracing the IPID field values enables the different devices to be identified. It has been proposed to analyze IPID field values in a packet stream to determine the number of hosts behind a NAT in the document A Technique for Counting NATted Hosts, Steven M. Bellovin, available on the Internet. However, the author stated that the proposed method is primarily suitable for analyzing NAT's serving networks with comparatively little Intranet traffic, e.g., home NAT's and hotel NAT's, but not the majority of businesses, which tend to run their own file and email servers.

An embodiment of the invention provides a method for the identification of devices on a packet-switched network, which is carried out by sampling a portion of data packets traversing the network, the portion being less than all of the packets, identifying a first sampled packet and a second sampled packet that have a common source address, comparing numerical identification fields of the first and second sampled packets, and responsively to the comparison, determining that the first sampled packet and the second sampled packet were emitted by different devices.

An aspect of the method includes counting a number of the devices accessing the network via a NAT intermediary.

According to another aspect of the method, the numerical identification field is an IPID field.

According to one aspect of the method, the packets are emitted in packet flows by the devices, and sampling includes evaluating a first packet, a last packet, and an intermediate packet of one of the packet flows during a measuring interval.

Yet another aspect of the method determining includes obtaining a difference between the numerical identification field of the first sampled packet and the numerical identification field of the second sampled packet, and when the difference exceeds a predetermined value, determining that the first sampled packet and the second sampled packet were emitted by the different ones of the devices.

A further aspect of the method includes maintaining a list of currently identified devices having the common source address, recording for each of the currently identified devices packet information including a last observed numerical identification field and a last observed timestamp. The method is further carried out using a new sampled packet as the first sampled packet and iterating the comparison using the last observed numerical identification field of respective ones of the currently identified devices as the second sampled packet, and associating the new sampled packet with a new identified device when the numerical identification field of the new sampled packet differs from the last observed numerical identification field of each of the currently identified devices by more than a predetermined difference.

When the numerical identification field of the new sampled packet does not differ from the last observed numerical identification field of any of the currently identified devices by more than the predetermined difference, the method includes associating the new sampled packet with one of the currently identified devices, wherein a difference between the numerical identification field of the new sampled packet and the last observed numerical identification field of the one currently identified device is minimal, and updating the last observed numerical identification field and the last observed timestamp of the one currently identified device with corresponding information from the new sampled packet.

Still another aspect of the method includes calculating an inactivity interval between a current time and the last observed timestamp of one of the currently identified devices, wherein the inactivity interval exceeds a predetermined length, and deleting the one currently identified device from the list.

An embodiment of the invention provides a computer software product for the identification of devices on a packet-switched network, including a computer-readable medium in which computer program instructions are stored, which instructions, when read by a computer, cause the computer to sample a portion of data packets traversing the network, the packets each including a source address and a numerical identification field, wherein the portion of data packets is less than all of the packets. The computer is further instructed to identify a first sampled packet and a second sampled packet having a common source address, to calculate a comparison between the numerical identification fields of the first and second sampled packets, and responsively to the comparison, to determine that the first sampled packet and the second sampled packet were emitted by different ones of the devices.

An embodiment of the invention provides a system for the identification of devices on a packet-switched network, including a detection unit operative for sampling a proportion of data packets traversing the network, wherein the proportion of data packets is less than all of the packets. The system includes a processing unit that receives data from the detection unit, the processing unit operative for identifying a first sampled packet and a second sampled packet having a common source address, making a comparison of the numerical identification field of the first sampled packet with the numerical identification field of the second sampled packet, and responsively to the comparison, determining that the first sampled packet and the second sampled packet were emitted by different ones of the devices.

An embodiment of the invention provides a system for the identification of devices on a packet-switched network, including detection means for sampling a proportion of data packets traversing the network, wherein the proportion of data packets is less than all of the packets. The system includes processing means for analyzing data from the detection means, the processing means operative for identifying a first sampled packet and a second sampled packet having a common source address, making a comparison of a characteristic of the first sampled packet with the corresponding characteristic of the second sampled packet, and responsively to the comparison, determining that the first sampled packet and the second sampled packet were emitted by different ones of the devices. The characteristic may be an IPID field value or a sender name.

According to a further aspect of the system, the processing means is operative for determining a number of HTTP flows per unit time responsively to the characteristic, and for counting a number of the devices according to the number of HTTP flows.

Figure 1:
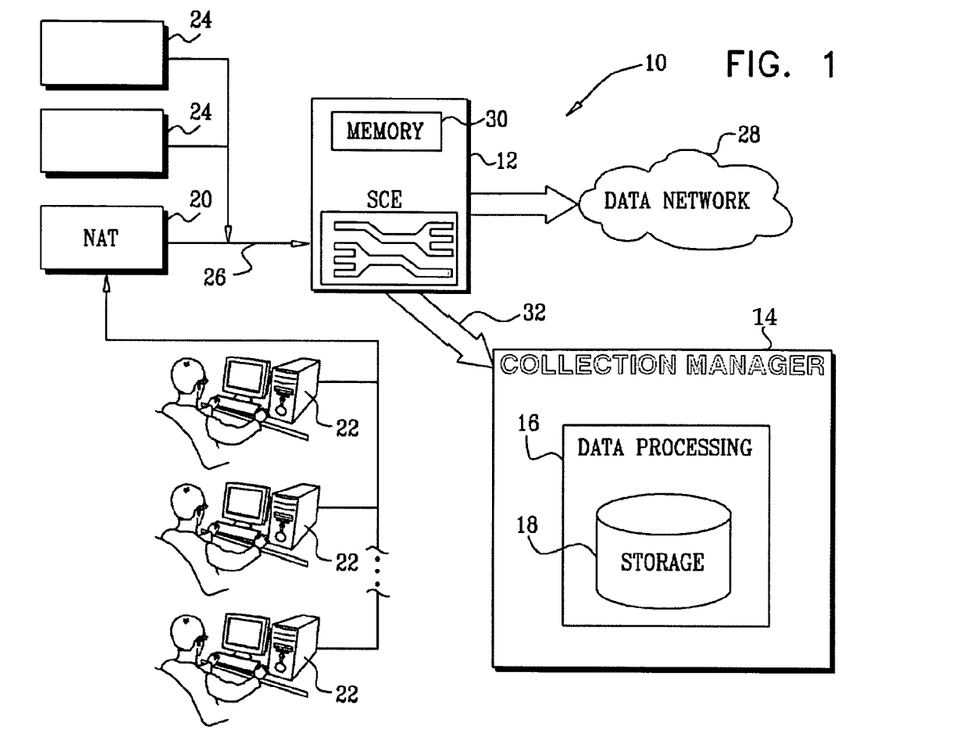
FIG. 1 is a pictorial diagram of an apparatus for the determination of the number of devices are behind a NAT device on a data network in accordance with a disclosed embodiment of the invention.

Turning now to the drawings, reference is initially made to FIG. 1, which is a pictorial diagram of an apparatus 10 suitable for the determination of the number of devices are behind a NAT on a data network, in accordance with a disclosed embodiment of the invention. The apparatus 10, which would typically be operated by an Internet service provider, comprises a detection component 12 (SCE), and a collection manager 14 (CM). The collection manager 14 includes a data processing component 16, and a data storage device 18. The detection component 12 and the collection manager 14 can be implemented as a general purpose computer that includes a processor and a memory. The memory contains objects corresponding to the functional blocks depicted in FIG. 1. Alternatively, elements of the detection component 12 and the collection manager 14 can be realized as dedicated hardware, which is specialized for execution of the algorithm described hereinbelow.

The detection component 12 is linked to a data network, from which it receives a stream of packets originating from a NAT 20. The packets may be compliant with a tunneling protocol, such as some version of the multi-protocol label switching protocol (MPLS). The NAT 20 services any number of communications devices 22, which are shown representatively in FIG. 1 as personal computers. However, the devices 22 are not limited to computers, and can be many different types of networked devices, in many combinations, for example different kinds of appliances.

The detection component 12 is a network element that receives all outbound network traffic from the NAT 20, and may receive network traffic from other packet sources 24, which could themselves be NAT's. The input to the detection component 12 is shown as a packet stream 26. The IP address of the NAT 20 differs from the IP addresses of the sources 24. The traffic is passed from the detection component 12 to a data network 28, such as the Internet. None of the network traffic is blocked by the detection component 12. However, some packets are sampled from the packet stream 26 by the detection component 12. Packets that are not sampled may be recognized in the detection component 12 but ignored, or may not be recognized at all. The proportion of packets sampled in the detection component 12 may vary, but is less than all of the packets passing therethrough.

Report data records (RDR's), which are messages containing information about IPID values found in the sampled packets, are sent from the detection component 12 to the collection manager 14. The RDR's are segregated into respective data flows according to IP addresses. Each item in a flow includes a packet numerical identification field, which typically is the IPID field of the IP header, and also includes a timestamp. Alternatively, other header fields might function as the numerical identification field. Typically, flow information is initially collected in a memory 30. When a threshold number of packet extracts has accumulated in a RDR, the RDR is sent to the data processing component 16 in the collection manager 14 via a link 32.

Although the detection component 12 and the collection manager 14 are shown as separate elements in FIG. 1, they may be co-located and even incorporated in the same physical unit.

Specific packets are selected as representative samples by the detection component 12 during a measuring interval. The measuring interval is not critical, and may be chosen based on traffic volume and equipment capabilities. One-hour intervals are suitable. A packet flow is established in accordance with the well-known TCP Protocol, by transmission of a SYN packet, which opens a TCP socket. The last packet in a flow is usually a TCP FIN packet, at which time the socket is released. Samples extracted from the packets in the stream having a common IP address may be selected for analysis by the data processing component 16 as follows: (1) the first packet observed and (2) the last packet observed by the detection component 12 during a measuring interval; and (3) at least one other packet of the flow occurring at any time during the measuring interval. In the case of short flows, only the first and last packets may be sampled.

Other sampling schemes may also be used, for example random sampling, so long as the number of samples is an arbitrarily small proportion of the packet stream 26. By ignoring some of the packets, the apparatus 10 is able to process traffic originating from a large number of devices and IP addresses without becoming saturated.

The extracted information is passed to the data processing component 16 of the collection manager 14. The detection component 12 collects IPID field values in a buffer, sending a RDR to the data processing component 16 DC only when the buffer is full. There is a tradeoff between the size of the buffer and the RDR traffic. The larger the buffer, the lower the RDR traffic and vice versa.

In some embodiments, optimal performance is achieved by ignoring contiguous IPID field values (or IPID field values that differ by less then a predefined value from the pre-ceding IPID field value). These are presumed to originate from the same device, and need not be analyzed by the data processing component 16. On the other hand, two packets having IPID field values that differ by a sufficiently large value, typically 3000-5000, are presumptively treated as having originated from two different devices. In actuality, the two packets may have originated from the same device. However, as explained below, an aging mechanism prevents a false elevation of the count of currently active devices. Nevertheless, in the case of devices in which the IPID values advance relatively slowly, if too many IPID values are filtered, there is a risk of inappropriately aging the device. Thus, this optimization must be cautiously implemented by imposing two conditions that need to be satisfied before removing an IPID value from a RDR: An IPID value might be removed from the RDR if (1) it is close enough to a previously seen IPID value and (2) the time that has passed since the last IPID value was reported does not exceed a threshold.

The data processing component 16 listens to the detection component 12 on a specific port for raw data records. When a raw data record arrives, the data processing component 16 extracts the appropriate fields of the packet header, and responsively to the field values, sends the raw data record. The data processing component 16 processes the raw data record and detects how many different devices are behind the IP associated with the raw data record. The raw data records and data derived by the data processing component 16 from the raw data records are memorized in the storage device 18. The data processing component 16 accumulates data and calculates statistics that measure the flow activity. The data processing component 16 accesses a database in the storage device 18 from time to time in order to access data required to generate reports that are issued by the collection manager 14.

The data processing component 16 runs an algorithm, described below, by which it determines how many different devices are using the IP address of the NAT 20. Additionally, the algorithm may also be applied to each of the sources 24. The collection manager 14 compiles statistical information derived from the output of the data processing component 16, and may generate reports at predetermined times or on demand.

Detection of Devices Sharing an IP Addresses.

Continuing to refer to FIG. 1, the algorithm executed by the data processing component 16 is based on the fact that in the TCP/IP protocol, each device in the classical IP stack implements a packet counter, and inserts the current value of the counter into the IPID field. The initial count may start at any number but from that point on the packet number is incremented by one until it reaches a maximum value, whereupon it folds back to zero. When multiple devices share an IP address, their packet counters generally have different values, and increment at different rates, according to their respective traffic originations. If, during a short time interval, two packets are observed to have the same IP source address, but have IPID field values that differ sufficiently, it is inferred that the two packets were generated by different devices. In general, the number of "very different" IPID field values observed during such an interval provides a conservative estimate of the number of active devices sharing an IP address that are active at the same time. The packets are sampled at discrete time points, and intermediate time points are determined by interpolation. Preferably, packets are sampled at the beginning of a flow, at the end of the flow, and in the case of longer flows, every 30 seconds during the flow.

The algorithm described below may underestimate the number of devices 22 behind the NAT 20. For example, in streaming applications, the packet flows emitted by some devices may be so long that the sampling process may fail to detect them.

Figure 2:
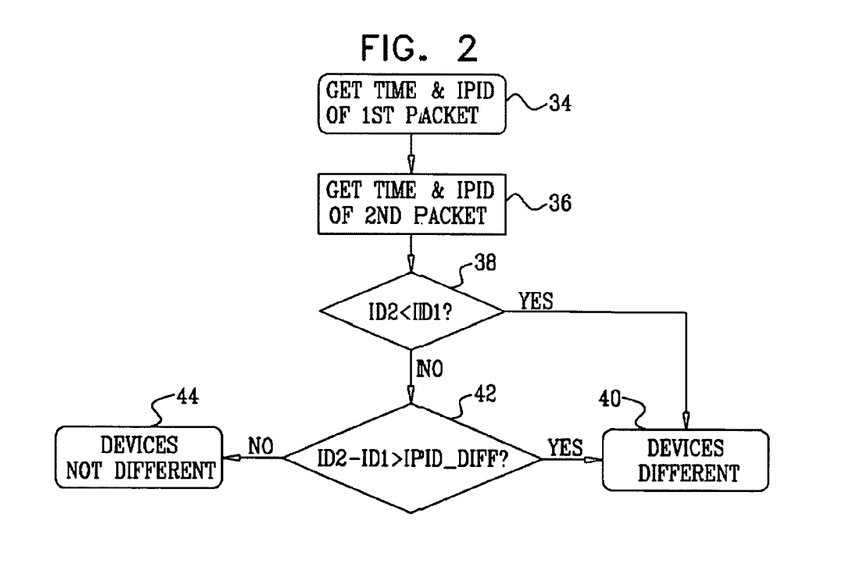
FIG. 2 is a flow chart of a method of differentiating among different networked devices sharing an IP address in accordance with a disclosed embodiment of the invention.

Reference is now made to FIG. 2, which is a high level flow chart of a method of differentiating among different networked devices sharing an IP address in accordance with a disclosed embodiment of the invention. A stream of packets is sampled, and divided into flow channels, which are sequences having common IP addresses. At initial step 34, a first packet of one of the flow channels is examined. Its IPID field value (ID1) and its timestamp (PT1) are recorded. Here the timestamp is recorded as the time the packet was processed in the detection component 12 (FIG. 1).

Next, at step 36 a second packet of the same flow channel used in initial step 34 is examined. Its IPID field value (ID2) and its timestamp (PT2) are recorded.

Control now proceeds to decision step 38, where it is determined if the IPID field value of the second packet is smaller than that of the first packet. If the determination at decision step 38 is affirmative, then control proceeds to final step 40. It will be recalled that the IPID field values of successive packets produced by the same device increment. Therefore, the first and second packets are determined to have been produced by different devices, and the procedure terminates.

If the determination at decision step 38 is negative, then control proceeds to decision step 42. The IPID field values of the two packets are now evaluated by determining the difference ID2-ID1. It is possible to determine the value that would be assumed by the IPID field value in packets emitted by the device that produced the first packet at all intermediate points in time to derive a time dependent maximum value for the IPID field value (IPID_DIFF). Typical values for the parameter IPID_DIFF are 300-500. Its value is adjusted for the flow rate and the number of flows being processed. In decision step 42, it is determined whether the difference ID2-ID1 exceeds the value IPID_DIFF.

If the determination at decision step 42 is affirmative, then control proceeds to final step 40.

If the determination at decision step 42 is negative, then control proceeds to final step 44. It cannot be concluded that more than one device produced the first and second packets.

Figure 3:
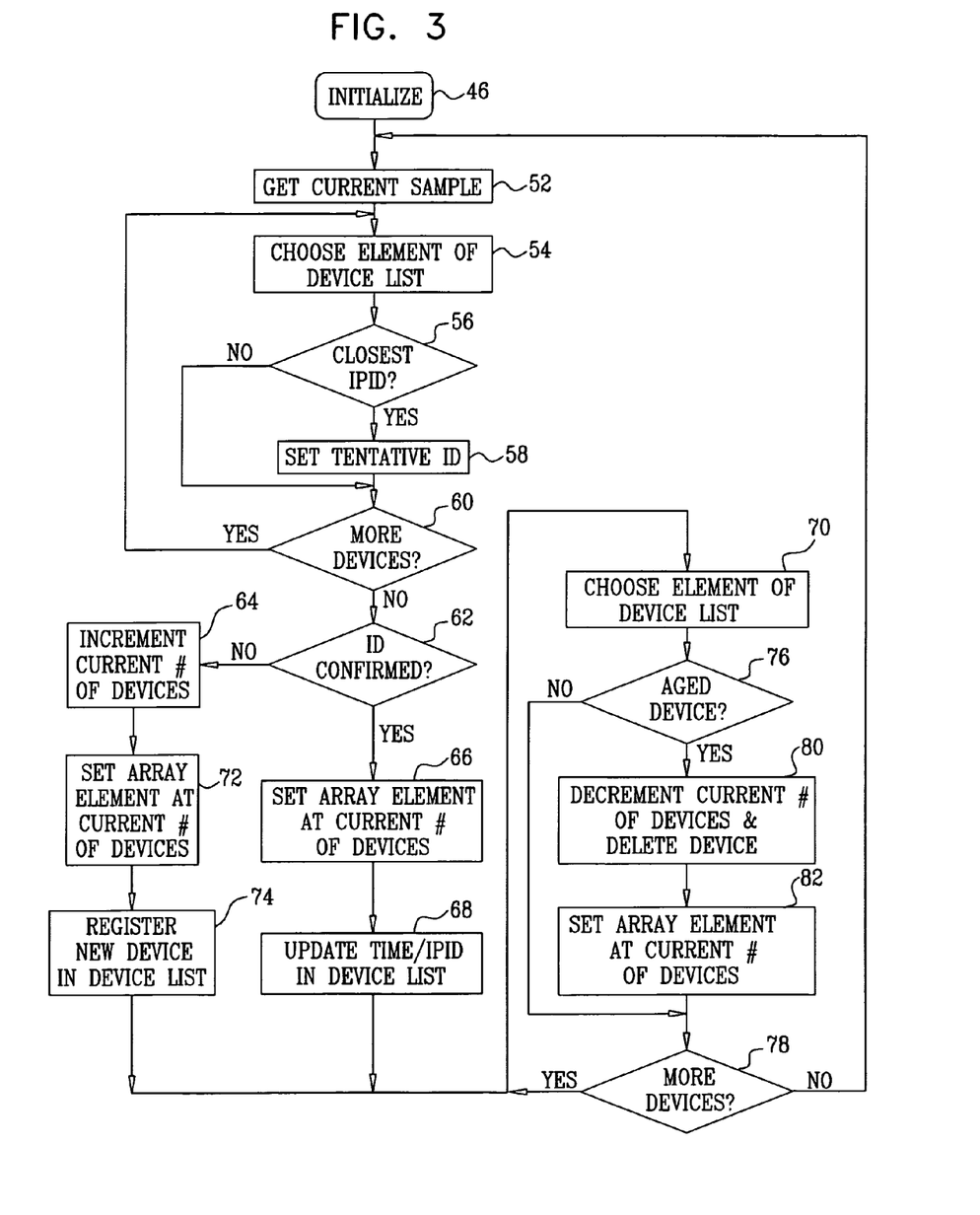
FIG. 3 is a flow chart of a method for detection of multiple networked devices sharing a common IP address, in accordance with a disclosed embodiment of the invention.

Reference is now made to FIG. 3, which is a flow chart of a method for detection of multiple networked devices sharing a common IP address, in accordance with a disclosed embodiment of the invention. The method is explained with reference to one IP address. However, it will be understood that any number of IP addresses can be evaluated concurrently. For purposes of the description that follows, it is assumed that the samples of a packet stream have been filtered, and that all packets being considered have a common IP address. The process steps are shown in a linear sequence in FIG. 3 for clarity of presentation. However, it will be evident that many of them can be performed in parallel, asynchronously, or in different orders.

At initial step 46 the following data structures for an IP address currently being evaluated are initialized:

(1) a one-dimensional circular array for holding information describing the number devices that are detected at points in time. 4 KB is suitable for this array.

(2) a list of currently detected devices. The list records the timestamp and IPID field value of the last packet sample associated with the device; and (3) a data structure for holding the timestamp and IPID field value of a current packet sample.

Figure 4:
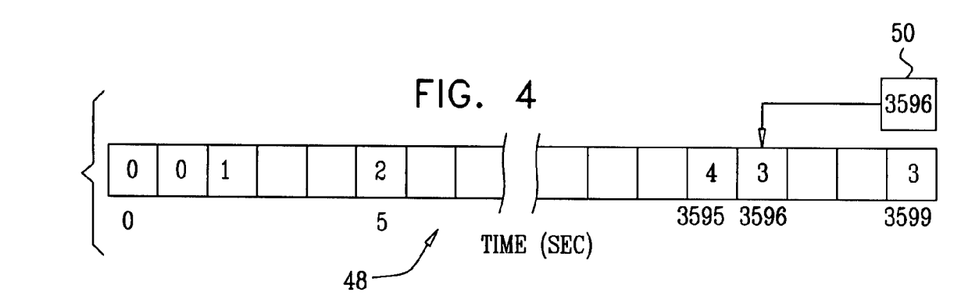
FIG. 4 is a diagram representing an exemplary array for recording the number of detected devices over time, in accordance with a disclosed embodiment of the invention.

Reference is now made to FIG. 4, which is a diagram representing an exemplary array 48 for recording the number of detected devices over time, in accordance with a disclosed embodiment of the invention. The array 48 has 3600 elements and holds one hour of data. Thus, the array can record the number of detected devices at a granularity of seconds. An index 50 to the array is incremented modulo 3600. In FIG. 4, the index 50 points to the 3596th element of the array 48, and which has a value of three. This means that three devices sharing the same IP address were active at the 3596th second of the current measuring interval. The array 48 is often a sparse array. In environments where it is necessary to conserve memory, it may be desirable to track the number of detected devices using another data structure, for example a linked list. Indeed, the record of active devices over time can be maintained using many different data structures, as is known in the art.

Referring again to FIG. 3, following initial step 46, control proceeds to step 52, where a packet is selected as a current sample. In subsequent steps, data of the current sample will be compared to corresponding data in the list of devices that was established in initial step 46. The current sample has a timestamp (currentTimePoint), and an IPID field value (currentIPID).

Next, at step 54 an element of the list initialized in initial step 46 is chosen. On the first iteration of step 54, the current sample may be inserted into the list as its first element. Thus, the element chosen is identical with the current element.

Control now proceeds to decision step 56, where it is determined if the value currentIPID is closer to the IPID field value of the element chosen in step 54 than to the closest IPID field value found in previous iterations of decision step 56. Of course, this determination will always be affirmative on the first iteration of decision step 56.

If the determination at decision step 56 is affirmative, then control proceeds to step 58. The element chosen in step 54 is marked as having the closed IPID field value, and is tentatively identified with the current element.

After completing step 58, or if the determination at decision step 56 is negative, control proceeds to decision step 60, where it is determined if there are more devices in the list to be processed. If the determination at decision step 60 is affirmative, then control returns to step 54 to begin another iteration of the loop.

If the determination at decision step 60 is negative, then control proceeds to decision step 62. Here the method described above with reference to FIG. 2 is performed, and a determination is made whether the device represented by the current sample and the device tentatively identified with the current sample in step 58 are indeed identical.

If the determination at decision step 62 is negative, then control proceeds to step 64, which is described below.

If the determination at decision step 62 is affirmative, then control proceeds to step 66. The tentative identification made in step 58 is now confirmed. No new devices have been detected. The element of the array corresponding to the time currentTimePoint is assigned a value equal to the current number of active devices.

Next, at step 68 the IPID field value and timestamp of the list entry (initial step 46) corresponding to the device identified with the current sample are updated to the values of the current sample. Control proceeds to step 70, which is described below.

If the determination at decision step 62 is negative, it is concluded that a new device has been detected. At step 64, the current number of devices is incremented. Then, at step 72, The element of the array corresponding to the time currentTimePoint is assigned a value equal to the current number of active devices.

Next, at step 74, the new device is registered by adding the current sample as a new element to the list of currently detected devices.

After performance of either step 68 or step 74, a sequence begins in which the device list is again scanned in order to identify devices that have been inactive for a predetermined period of time, that is no packets identified with the device have been received within the time interval. 120 seconds is a typical value for this interval. Such a device is considered to be "aged" and is removed from the device list. This is done in order to prevent a large disparity in IPID field values of a device from being seen, which would result in a current sample failing to be identified with the inactive device. If this were to happen, a current sample might be incorrectly classified as a new device. It will be recalled from the discussion of FIG. 2, that when the difference between the last known IPID field value of a device and the IPID field value of the current sample exceeds the value IPID_DIFF, it is concluded that the current sample does not correspond to the device being compared. Aging of devices ensures that such a false classification does not occur.

There may be more than one reason for a device to be seen as inactive: For example, the device could be disconnected or inoperative. Alternatively, the device could have been occupied with intranet traffic, which would not be seen by the NAT. As a further possibility, the packet-sampling rate could be very low in comparison to the traffic generated by the device.

At step 70 an element of the list initialized in initial step 46 is chosen.

Control now proceeds to decision step 76, where it is determined if the device corresponding to the current element is inactive. If the determination at decision step 76 is negative, then control proceeds directly to decision step 78, which is described below. In some embodiments, the loop comprising decision step 76 need not be synchronized with the sampling cycle, as shown in FIG. 3. Instead, it is performed at predetermined time intervals.

If the determination at decision step 76 is affirmative, then control proceeds to step 80. The number of current devices is decremented. The device corresponding to the current element is deleted from the list.

Next, at step 82 the element of the array corresponding to the time currentTimePoint is reassigned a value equal to the current number of active devices.

Control now proceeds to decision step 78, where it is determined if more devices of the list remain to be evaluated. If the determination at decision step 78 is affirmative, then control returns to step 70 to begin a new iteration of the loop.

If the determination at decision step 78 is negative, then control returns to step 52 to process another packet sample.

The number of devices sharing an IP address that were simultaneously active can be determined by scanning the array, and identifying the highest value among the array elements. This may be done at any time after completion of a measuring interval. It will be recalled that the array is cyclic, so that the last time interval equal to a measuring interval is always available after completion of the first measuring interval. It is also possible to obtain a preliminary determination prior to completion of a measuring interval, it being understood that this would likely be less accurate than awaiting completion of the measuring interval.

IPID Calculations.

The IPID field is a 16 bit field. As noted above, in successive packets the IPID field values of each device are always incremented. However, the above-noted document RFC-791 does not specify a format for the IPID field. In practice, two methods that are used to increment the IPID field value, depending on the byte order employed by the operating system of the device that originated the packets. One method, which, for purposes of the following examples is assumed to be compliant with native byte interpretation of the apparatus 10 (FIG. 1), the high byte precedes the low byte, and the low byte is incremented. Using this method, the apparatus 10 would interpret two successive exemplary IPID field values as follows:

$IP_{n-1}$=0x2233
$IP_n$=0x2234.

In another method, the low byte precedes the high byte. The low byte is still incremented, however. The apparatus 10 would interpret the above example as follows:

$IP_{n-1}$=0x2233
$IP_n$=0x2333.

The apparatus 10 itself is not constrained to any byte order. Whatever its native byte order, it is only necessary that the comparisons described above with respect to FIG. 2 and FIG. 3 be performed using both byte orders. The byte order to be used for a particular device is chosen by comparing differences between two IPID field values, and selecting the more reasonable of the two possibilites.

EXAMPLE

Figure 5:
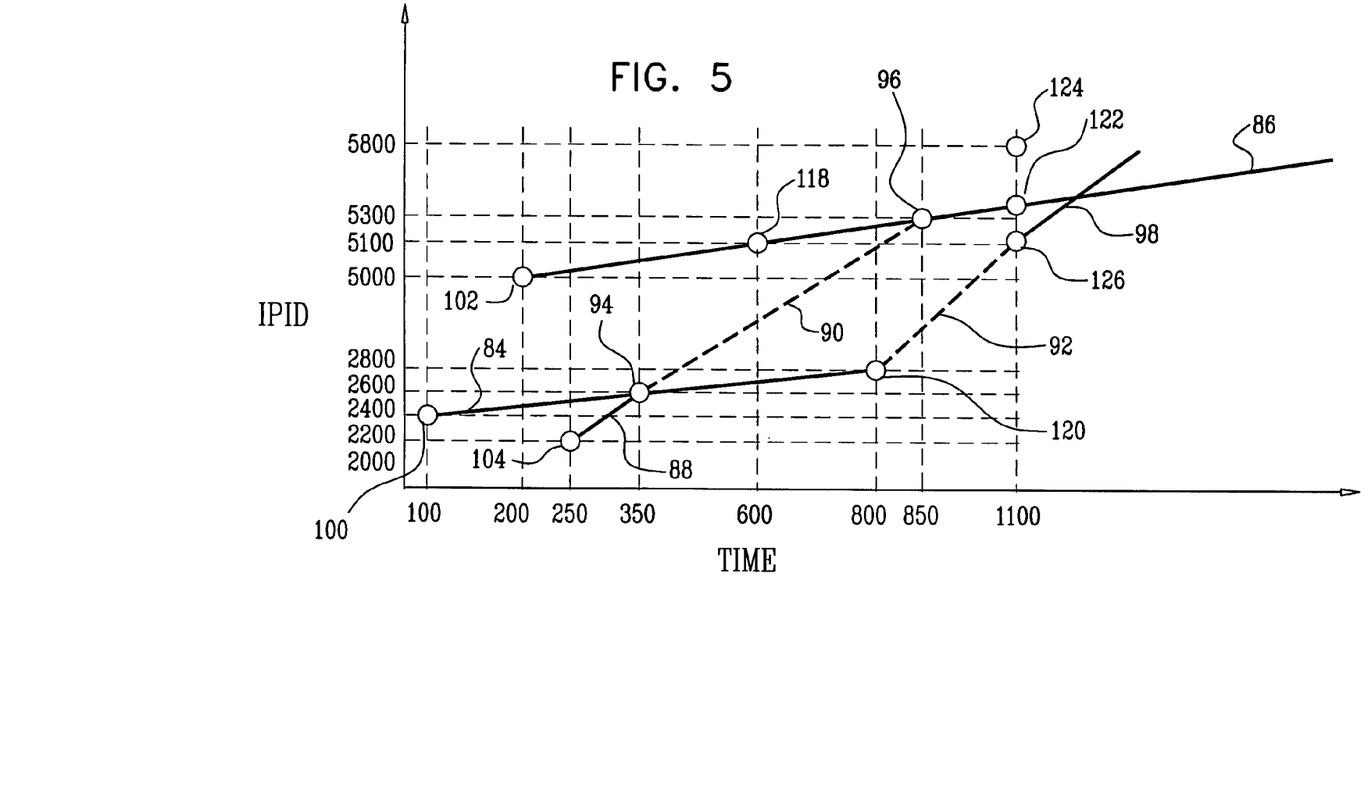
FIG. 5 is a graph in which IPID field values of multiple packet flows are plotted over time, in accordance with a disclosed embodiment of the invention.

Reference is now made to FIG. 5, which is a graph in which IPID field values of multiple packet flows, represented by line segments 84, 86, 88 are plotted over time, in accordance with a disclosed embodiment of the invention. Samples are taken as described above, and processed using the methods shown in FIG. 2 and FIG. 3.

The graph in FIG. 5 also has two broken line segments 90, 92, which represent possible alternative interpretations of the sampled IPID data. The broken line segment 90 represents an estimation of packet IPID field values during a time interval 350-850 by a single device that, as explained below, could be associated with the line segment 86, 88. Presumably, due to relatively sparse sampling of the packet stream, these packets were missed by the sampling process. Therefore, at this point in the process, it is not clear whether the points 94 and 96 belong to a single device or to two different devices transmitting flows at different times. This ambiguity may be resolved later in the process. Similarly, due to the possibility of intranet traffic or a variation traffic production, it cannot be immediately determined whether the line segments 84, 98 should be associated with the same device or with different devices. This ambiguity is indicated by the broken line segment 92.

At time 100, the first flow is opened and a sample taken. A currently sampled packet IPID field value is determined to be 2400. This value is plotted as an end point 100 of the line segment 84. A new device is added to the device list, its entry having a current IPID field value of 2400, and a timestamp of 100. Element 100 of the array 48 (FIG. 4) is set to one. Elements 0-99 have a value of zero (not shown).

Next, at time 200, a second flow is opened and a sampled packet IPID field value determined to be 5000. The difference between the IPID field value of the packet represented by the end point 100 (2200) and the new IPID field value (5000) is too large to be consistent with packets emitted by a single device, according to the parameter IPID_DIFF. Therefore it is concluded that a different device has opened the flow. A new device is added to the device list with a current IPID field value of 5000 and a timestamp of 200. Element 200 of the array 48 is set to one. Element 200 is not set to the value 2 at this time, because it cannot yet be determined that the device identified at time 100 is currently active. This determination may be made retroactively, however, should a packet pertaining to that device be identified in the future. The current IPID field value is plotted as an end point 102 of the line segment 86.

Next, at time 250, a third flow is opened and a sampled packet IPID field value is found to be 2000. In applying the method described in FIG. 2, it is found that the differences between the new IPID field value (2000) and the last known IPID field values of the devices currently known to be active (2200, 5000) are negative. Therefore, the new flow could not have been emitted by either of them. A new device is added to the device list with a current IPID field value of 2000 and a timestamp of 250. The new IPID field value is plotted as an end point 104 of the line segment 88. Element 250 of the array 48 is set to one.

Figure 6:
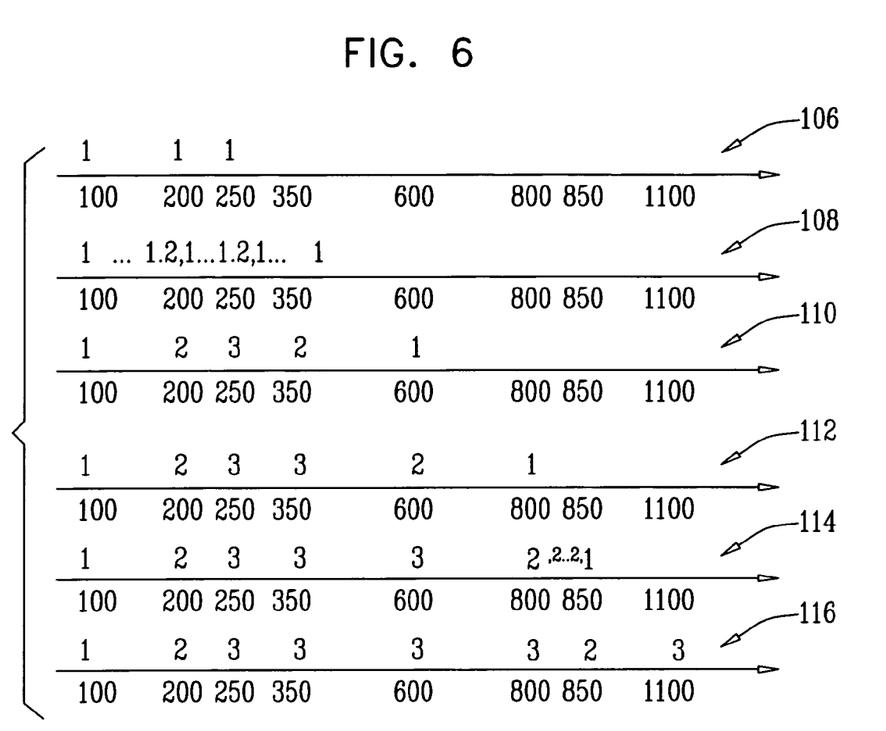
FIG. 6 is a series of graphs representing states of an array similar to the array shown in FIG. 4 at different points in time, in accordance with a disclosed embodiment of the invention.

Reference is now made to FIG. 6, which is a series of graphs 106, 108, 110, 112, 114, 116 representing states of the array 48 (FIG. 4), at different points in time relating to FIG. 5, in which element numbers are shown below an arrow, and values of elements that have been set are indicated by numbers above an arrow 104, in accordance with a disclosed embodiment of the invention. In the graph 106, elements 100, 200, and 250 of the array all have the value 1.

Referring again to FIG. 5, at time 350, a packet have an IPID field value of 2600 has arrived. Of the known devices, the one having the closest last known IPID field value (IPID field value 2400) is the first device, which was plotted as the end point 100. The new packet is identified with the first device. Its list entry is updated, so that its current IPID field value is set to 2600. It is concluded that the first device has been active at times between 100 (the device's last known time stamp) and 350 (the device's current time stamp). To indicate this the values of all elements in the array 48 between 100 and 350 are increased by one.

It will be recalled from the discussion of FIG. 3 that when a newly detected IPID value is assigned to an existing device, all the values in the array from the last time this device was seen to the current time are incremented. This is done retrospectively, because the values assigned to array elements represent the number of devices known to definitely exist at the time represented by the element. Since previously known devices could have all become aged, the value of the array element representing the time of the current sample cannot be larger than one. Only the device that is assigned to the current sample is known to definitely exist at the current time.

Setting the values of the intermediate elements, i.e., elements 101-349 provides a useful graph for analysis. However, this step can be omitted, as an optimization. The IPID field value of the current packet is plotted as a point 94. It will be noted that on the IPID axis in FIG. 5, the device associated with the end point 100 is closest to the point 94. Accordingly, the list entry for the first device is updated with the current IPID field value and timestamp.

As shown in the graph 108 (FIG. 6), following the above-described incrementation, the elements 100-199, 201-249, and 251-350 of the array 48 have the value 1 and the elements 200 and 250 have the value 2.

At time 600, a packet with an IPID field value of 5100 has arrived, Among the currently listed active devices, the one having the closest IPID field value (5000) is the second device, which was plotted as the end point 102. The list entry of the second device is updated with the current IPID field value and timestamp. Its current IPID field value is set to 5100 and the elements of the array 48 between the last time stamp of the second device (200) the current time stamp (600) are incremented by one. Element 600 is assigned a value of one. The values of elements 351-600 are also set to the value 1. The IPID field value of the current packet is plotted on the line segment 86 as a point 118.

As shown in the graph 110 (FIG. 6), following the last incrementation, the element 250 has the value 3. Elements 201-249 and 251-350 of the array 48 now have the value 1.

At time 800 a packet with an IPID field value of 2800 has arrived. Among the currently listed active devices, the one having the closest IPID field value is the first device, which has a current IPID field value of 2600. The first device is identified with the current packet. The packet is plotted as a point 120 on the line segment 84. The list entry for the first device is updated with the current IPID field value and timestamp, 2800 and 800, respectively. As shown on the graph 112 (FIG. 6), Element 800 of is assigned a value of one. Element 600 is incremented, and now has a value of two. Elements 601-799 are set to a value of one (not shown).

At time 850 a packet with an IPID field value of 5300 has arrived. Repeating the analysis described above, this packet is ascribed to the device associated with the line segment 86, which is updated accordingly with the current IPID field value and timestamp, 5300 and 850, respectively. The packet is plotted as a point 96. Element 850 is set to a value of one. Upon evaluation of historic data, it appears that the device associated with the line segment 88 has been inactive, and is aged accordingly by deletion from the list of currently active devices. A time interval of 120 seconds without activity is suitable for aging a device. The number of active devices is decremented. Elements 351-849 are decremented. After these operations are completed, as shown in graph 114, elements 800-849 have values of two.

At time 1100 three packets have arrived. Repeating the analysis described above, details of which are omitted in the interest of brevity, one of the new packets, having an IPID field value of 5300, is ascribed to the device associated with the line segment 86, and plotted as a point 122.

Another of the new packets has an IPID field value of 5800. For the reasons given above, it is ascribed to a new device and plotted as a point 124. The number of active devices is incremented by one.

The last new packet has an IPID field value of 5100. It is ascribed to a new device and plotted as a point 126, which is an end point of a line segment 98. The number of active devices is incremented by one.

It is now noted that the device associated with the line segment 84 has become inactive. The number of active devices is decremented by one. As shown on the graph 116 (FIG. 6), the net effect of the activity at time 1100 is an increase in the number of active devices by one.

If no further activity were to occur during the current measuring interval, the number of devices having the same IP address would be determined to be three, which is the maximum number of active devices observed, as is evident from inspection of the graphs 106, 108, 110, 112, 114, 116 (FIG. 6).

Optimizations.

Referring again to FIG. 4, in order to avoid repeating the evaluation of historic data each time that a new sample is taken, data that was collected during a time interval immediately prior to the current sample are scanned to detect the highest value. This time interval extends at least back to the time of the last sample. However, it is never less than a predefined value, typically 120 seconds. Following determination of the highest value, the elements corresponding to the prior time interval are cleared. It will be recalled that the array 48 is cyclic. Thus indexing for the array 48 to determine the elements to evaluate and clear is performed modulo 3600. Of course, in arrays having different dimensions, the modulo value will vary according to the number of elements.

In order not to be limited by the performance of the algorithm, the following data structures are configured: Two hash tables are set up. One table contains the IP addresses that the system currently handles (currentlyHandledIPs). The other table holds IP addresses that were previously handled (alreadyHandledIPs). Both lists are initially empty.

The system is configured using several parameters:

MaxIPs—the number of IP addresses that the system can handle simultaneously;

IphandlePeriod—the longest time (in minutes) that the system should track an IP address; and RefreshPeriod—An interval (in minutes) during which the same IP can be handled.

When a packet enters the system, its IP address is checked. If the IP address appears in the alreadyHandledIPs hash table than it is ignored. If the IP address is not in the alreadyHandledIPs hash table) and if the currentlyHandledIPs hash table contains fewer than maxIPs IP addresses, it is handled by the algorithm and added to the currentlyHandledIPs hash table (if it is not already there).

When the currentlyHandledIPs hash table is full, that is it contains maxIPs IP address, only packets that were generated by IP addresses that are contained in the currentlyHandledIPs hash table are handled, and all the rest are ignored.

Every IPhandlePeriod minutes all the IP addresses in the currentlyalreadyHandledIPs hash table is copied to the alreadyHandledIPs hash table, and the currentlyHandledIPs hash table is cleared.

Every refreshperiod minutes both hash tables are cleared.

Alternative Embodiment 1

Heuristic methods may be used to estimate the number of devices behind a NAT, instead of or in addition to the computational method described above. For example, the detection component 12 (FIG. 1) may detect characteristics such as new HTTP flows and/or SMTP sender names. The data processing component 16 may then analyze, for a given source IP address, the number of HTTP flows per unit time or the number of different SMTP sender names. These number may be compared to statistical benchmarks indicating, for example, that an average device generates n HTTP flows per minute or is used by s SMTP sender names. The ratio of measured results to the relevant benchmark value gives an indication of the number of devices behind the NAT.

Alternative Embodiment 2

In the discussion of FIG. 3 and FIG. 5, once a device is detected, it is not assumed to continue to be active until its activity is confirmed by a subsequent IPID field value. In an alternative embodiment, devices may be assumed to be active until proved otherwise by an aging decision. The ultimate results are identical, whichever alternative is used.

APPENDIX

Table 2 shows the simulated effect of typical parameters on memory consumption, RDR rate and CPU utilization.

TABLE 2

| Traffic Speed | 250,000,000 | b/sec |
|---|---|---|
| Number of Subscribers | 50,000 | |
| Number Of Flows | 800,000 | |
| Flow size | 15,000 | Kb |
| Number of open Flows per second | 16,667 | Flow/Sec |
| Number of fields per RDR | 10 | Bytes |
| Number Of transmitted RDR's | 3,333 | sec |
| Memory usage per subscriber | 40 | Bytes |
| Processing time per RDR | 10 | microseconds |
| Total processing time | 11,111 | microseconds |
| CPU utilization | 1.11% | |

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for the identification of devices on a packet-switched network, comprising the steps of:
   receiving a packet stream of packets that are traversing said network, wherein said packets in said packet stream have a common source address and a numerical identification field;
   obtaining a packet sample, said packet sample comprising selected ones of said packets of said packet stream, said packet sample being less than all of said packets in said packet stream during a measuring interval;
   identifying a first sampled packet and a second sampled packet in said packet sample;
   comparing said numerical identification field of said first sampled packet with said numerical identification field of said second sampled packet; and
   responsively to said step of comparing, determining that said first sampled packet and said second sampled packet were emitted by different ones of said devices.

2. The method according to claim 1, further comprising the step of counting a number of said devices accessing said network via a NAT intermediary.

3. The method according to claim 1, wherein said numerical identification field is an IPID field.

4. The method according to claim 1, obtaining a packet sample comprises evaluating during a said measuring interval a first packet, a last packet, and an intermediate packet of said packet sample.

5. The method according to claim 1, wherein said step of determining comprises the steps of:
   obtaining a difference between said numerical identification field of said first sampled packet and said numerical identification field of said second sampled packet; and
   when said difference exceeds a predetermined value, determining that said first sampled packet and said second sampled packet were emitted by said different ones of said devices.

6. The method according to claim 1, further comprising the steps of:
   maintaining a list of currently identified devices having said common source address;
   recording for each of said currently identified devices packet information comprising a last observed numerical identification field and a last observed timestamp; and
   using a new sampled packet as said first sampled packet iterating said step of comparing using said last observed numerical identification field of respective ones of said currently identified devices as said second sampled packet; and
   said step of determining comprises associating said new sampled packet with a new identified device when said numerical identification field of said new sampled packet differs from said last observed numerical identification field of each of said currently identified devices by more than a predetermined difference.

7. The method according to claim 6, further comprising the steps of:
   when said numerical identification field of said new sampled packet does not differ from said last observed numerical identification field of any of said currently identified devices by more than said predetermined difference, associating said new sampled packet with one of said currently identified devices, wherein a difference between said numerical identification field of said new sampled packet and said last observed numerical identification field of said one of said currently identified devices is less than differences between said numerical identification field of said new sampled packet and said last observed numerical identification field of all others of said currently identified devices, respectively and;
   updating said last observed numerical identification field and said last observed timestamp of said one of said currently identified devices with corresponding information from said new sampled packet.

8. The method according to claim 6, further comprising the steps of:
   calculating an inactivity interval between a current time and said last observed timestamp of one of said currently identified devices, wherein said inactivity interval exceeds a predetermined length; and
   deleting said one of said currently identified devices from said list.

9. A computer software product for the identification of devices on a packet-switched network, including a computer storage medium in which computer program instructions are stored, which instructions, when executed by a computer, cause the computer:
   to obtain a packet sample, said packet sample comprising selected packets of a packet stream traversing said network, said packet sample being less than all of said packets in said packet stream during a measuring interval, said packets each including a source address and a numerical identification field;
   to identify a first sampled packet and a second sampled packet in said packet sample, wherein said source address of said first sampled packet is said source address of said second sampled packet are a common source address;
   to calculate a comparison between said numerical identification field of said first sampled packet and said numerical identification field of said second sampled packet; and
   responsively to said comparison, to determine that said first sampled packet and said second sampled packet were emitted by different ones of said devices.

10. A system for the identification of devices on a packet-switched network, comprising:
    a detection unit operative for receiving a packet stream of data packets that are traversing said network, wherein said data packets in said packet stream have a common source address and a numerical identification field, and for obtaining a packet sample, said packet sample comprising a proportion of said data packets of said packet stream traversing said network during a measuring interval, said proportion of said data packets being less than all of said data packets in said packet stream; and
    a processing unit, receiving data from said detection unit, said processing unit operative for identifying a first sampled packet and a second sampled packet in said packet sample;
    making a comparison of said numerical identification field of said first sampled packet with said numerical identification field of said second sampled packet; and
    responsively to said comparison, determining that said first sampled packet and said second sampled packet were emitted by different ones of said devices.

11. The system according to claim 10, wherein said processing unit is operative for:
    obtaining a difference between said numerical identification field of said first sampled packet and said numerical identification field of said second sampled packet; and when said difference exceeds a predetermined value, determining that said first sampled packet and said second sampled packet were emitted by said different ones of said devices.

12. The system according to claim 10, wherein said processing unit is operative for:
   maintaining a list of currently identified devices having said common source address;
   recording for each of said currently identified devices packet information comprising a last observed numerical identification field and a last observed timestamp; and
   using a new sampled packet as said first sampled packet iteratively making new instances of said comparison using said last observed numerical identification field of respective ones of said currently identified devices as said second sampled packet; and
   associating said new sampled packet with a new identified device when said numerical identification field of said new sampled packet differs from said last observed numerical identification field of each of said currently identified devices by more than a predetermined difference.

13. The system according to claim 12, wherein said processing unit is operative, when said numerical identification field of said new sampled packet does not differ from said last observed numerical identification field of any of said currently identified devices by more than said predetermined difference:
   for associating said new sampled packet with one of said currently identified devices, wherein a difference between said numerical identification field of said new sampled packet and said last observed numerical identification field of said one of said currently identified devices is less than differences between said numerical identification field of said new sampled packet and said last observed numerical identification field of all others of said currently identified devices, respectively; and
   updating said last observed numerical identification field and said last observed timestamp of said one of said currently identified devices with corresponding information from said new sampled packet.

14. The system according to claim 12, wherein said processing unit is operative for:
   calculating an inactivity interval between a current time and said last observed timestamp of one of said currently identified devices, wherein said inactivity interval exceeds a predetermined length; and
   deleting said one of said currently identified devices from said list.

15. A system for the identification of devices on a packet-switched network, comprising:
   detection means for receiving a packet stream of data packets that are traversing said network, wherein said data packets in said packet stream have a common source address and a numerical identification field, and for obtaining a packet sample, said packet sample comprising a proportion of said data packets of said packet stream traversing said network during a measuring interval, said proportion of said data packets being less than all of said data packets in said packet stream; and
   processing means for analyzing data from said detection means, said processing means operative for:
   identifying a first sampled packet and a second sampled packet;
   making a comparison of a characteristic of said first sampled packet with said characteristic of said second sampled packet; and
   responsively to said comparison, determining that said first sampled packet and said second sampled packet were emitted by different ones of said devices.

16. The system according to claim 15, wherein said characteristic is an IPID field value.

17. The system according to claim 15, wherein said processing means is operative for counting a number of said devices accessing said network via a NAT intermediary.

18. The system according to claim 15, wherein said detection means is operative for evaluating during said measuring interval a first packet, a last packet, and an intermediate packet of said packet sample.

* * * * *